US005868116A

United States Patent [19]

Betts et al.

[11] Patent Number: 5,868,116

[45] Date of Patent: Feb. 9, 1999

[54] WHITE SMOKE REDUCTION APPARATUS AND METHOD

[75] Inventors: Edward H. Betts, Chillicothe; David J. Doddek, Decatur; Charles J. Kocian, Peoria, all of Ill.; Marshall T. Kolb, Overland Park, Kans.; Gregg W. Uhland, Lafayette, Ind.; Shawn J. Weck, Edwards, Ill.

[73] Assignee: Caterpillar Inc., Peoria, Ill.

[21] Appl. No.: 865,447

[22] Filed: May 29, 1997

[51] Int. Cl.$^{6}$ .......................... F02D 41/22; G01M 15/00

[52] U.S. Cl. .......................................... 123/481; 73/116

[58] Field of Search ................................ 123/436, 481, 123/357, 446; 73/116, 118.1, 119 A

[56] References Cited

U.S. PATENT DOCUMENTS

| | | | |
|---|---|---|---|
| 4,841,765 | 6/1989 | Blanke | 73/119 A |
| 4,928,642 | 5/1990 | Atkinson et al. | 123/179.7 |
| 5,035,212 | 7/1991 | Hudson et al. | 123/323 |
| 5,117,790 | 6/1992 | Clarke et al. | 123/321 |
| 5,205,152 | 4/1993 | Clarke et al. | 73/116 X |
| 5,251,590 | 10/1993 | Faletti et al. | 123/179.21 |
| 5,445,129 | 8/1995 | Barnes | 123/446 |
| 5,477,827 | 12/1995 | Weisman, II et al. | 123/436 |
| 5,483,927 | 1/1996 | Letang et al. | 123/41.12 |
| 5,529,041 | 6/1996 | Andrews | 123/436 |
| 5,529,044 | 6/1996 | Barnes et al. | 123/496 |
| 5,564,391 | 10/1996 | Barnes et al. | 123/446 |

OTHER PUBLICATIONS

Benefits of New Fuel Injection Sys Tech on Cold Startability of Diesel Engines—SAE Technical Paper, Series #940586—Feb. 28,–Mar. 3, 1994.

*Primary Examiner*—Tony M. Argenbright
*Attorney, Agent, or Firm*—R. Carl Wilbur

[57] ABSTRACT

An apparatus and method for reducing white smoke during start up of a compression ignition engine is disclosed. The apparatus includes an engine cylinder, a fuel injector, an engine speed sensor, and a microprocessor. The microprocessor preferably includes an engine speed controller that governs the engine speed to a desired value. The microprocessor issues a first fueling level corresponding to a difference between an actual engine speed and the desired engine speed signal. The microprocessor quits fueling the engine cylinder then determines a second fueling level. A determination about whether the cylinder is firing is then based on a comparison between the first and the second fueling level.

5 Claims, 4 Drawing Sheets

WHITE SMOKE REDUCTION APPARATUS AND METHOD

TECHNICAL FIELD OF THE INVENTION

The present invention relates generally to an engine control and, more particularly, to a cylinder cut-out strategy for reducing white smoke in the exhaust of a compression ignition engine.

BACKGROUND ART

Compression ignition engines rely on the heat of compression to ignite the air/fuel mixture (hereinafter "fuel mixture") in the engine cylinder. The expansion of the ignited fuel mixture drives the piston and thereby powers the engine. In cold weather, it is oftentimes difficult to generate sufficient heat through compression alone to ignite fuel mixture, especially since the cold engine block acts as a heat sink, removing heat from the fuel mixture as it is compressed. In some instances, some of the engine cylinders will fire while the others do not. If a cylinder does not fire the fuel mixture is expelled through the exhaust system in a vaporized form generically referred to as "white smoke."

Reducing white smoke emission is important for several reasons. For example, white smoke is a pollutant and reducing white smoke reduces that amount of pollutant released into the environment. Also, white smoke results in reduced fuel economy and performance.

Prior art engine control systems have recognized the undesirability of white smoke. To some extent, such systems have been developed to avoid generating white smoke during engine startup. However, each of those devices suffer from drawbacks. For example, a system directed toward reducing white smoke is shown in U.S. Pat. No. 4,928,642 issued to Atkinson on May 29, 1990. The Atkinson patent discloses a system for automatically injecting a starting fluid, during engine cranking and for a period of time after the engine starts, based on one or more engine parameters. Injecting the starting fluid during the starting period lowers the flash point of the air/fuel mixture in the engine combustion chamber, thereby causing the fuel to burn more completely and reduce the white smoke emissions.

Another example of a system directed toward reducing white smoke is U.S. Pat. No. 5,035,212 issued to Hudson on Jul. 30, 1991. The Hudson patent discloses an apparatus for an exhaust restrictor designed to reduce white smoke during low idle conditions, such as a marine boat trolling in low idle. The exhaust restrictor includes a valve connected to the exhaust system and the intake system. The valve includes a housing having a through passage to the exhaust system and the intake system. A shaft is rotatably positioned in the housing. A plate is attached to the shaft. The plate is positioned in the passage and is movable between an opened position and a closed position. A mechanical linkage is connected to the throttle and the shaft. The linkage will move the plate into a exhaust restricting position corresponding with the throttle being moved into a low idle position.

The system disclosed in the Atkinson patent and the Hudson patent both require the addition of a mechanical means, such as a starting fluid injector setup or a exhaust restrictor system including a plate mechanically linked with a throttle, to function. The addition of the mechanical means may increase the cost and complexity of the system.

An example of a method for electronically controlling the fuel injection rate and fuel injection duration is disclosed in U.S. Pat. No. 5,445,129 issued to Barnes on Aug. 29, 1995. The Barnes patent discloses, in part, a method for fuel to be injected in a series of very short bursts, which may provide for lower emissions and white smoke reduction. However, the Barnes patent does not disclose a cylinder cutout system dedicated to reducing white smoke.

It would be desirable to develop an apparatus and method for detecting engine operation that causes white smoke and changing engine operation to reduce white smoke output.

DISCLOSURE OF THE INVENTION

In one aspect of the present invention an apparatus for reducing white smoke in a compression ignition engine is disclosed. Included in the apparatus is an engine cylinder, a fuel injector and a microprocessor. The microprocessor is connected to a memory device. The microprocessor issues a first fueling command to the fuel injector and determines a second fueling command when fueling is cut to the engine cylinder and thereafter compares said first and second fueling rate and determines whether said engine cylinder is firing.

In another aspect of the present invention, a method of controlling a compression ignition engine is disclosed. Preferably, the method includes measuring a first fuel rate, cutting fuel flow to a selected engine cylinder, measuring a second fuel flow rate; and, determining whether said selected engine cylinder is firing in response to a comparison between said first and second fuel flow rates.

These and other aspects and advantages of the present invention will become apparent upon reading the detailed description of the best mode embodiment in conjunction with the drawings and the appended claims.

BRIEF DESCRIPTION OF THE DRAWINGS

The present invention is described with respect to a preferred embodiment which is illustrated in the drawings.

DETAILED DESCRIPTION OF THE BEST MODE EMBODIMENT OF THE INVENTION

The following is a detailed description of the best mode of practicing the invention. The description herein is not a definition of the scope of the present invention, but instead is the best mode embodiment contemplated by the inventors. Instead, the present invention is defined by the claims appended hereto. This description provides sufficient detail of the best mode embodiment to permit those skilled in the art to make and use the present invention readily and easily.

Figure 1:
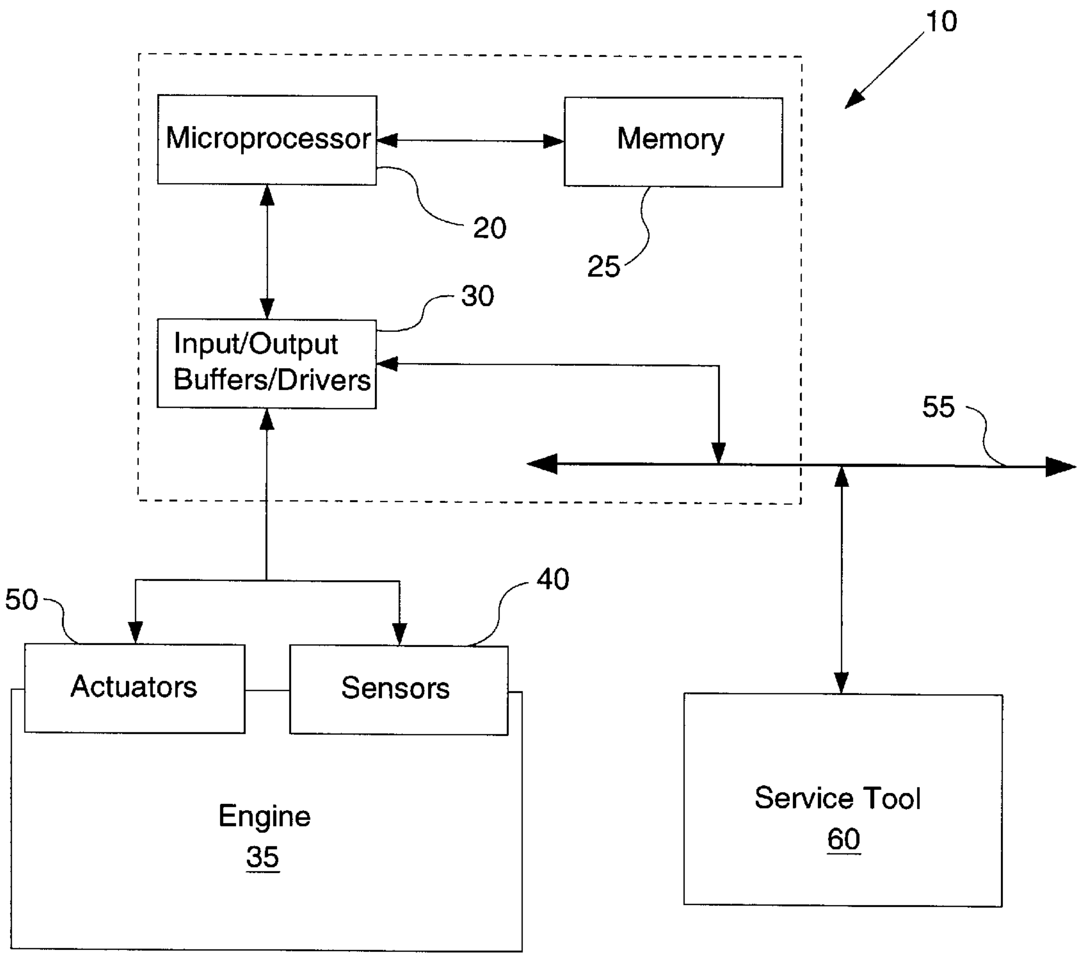
FIG. 1 illustrates a system level block diagram of a preferred embodiment of the engine control of the present invention.
Figure 2A:
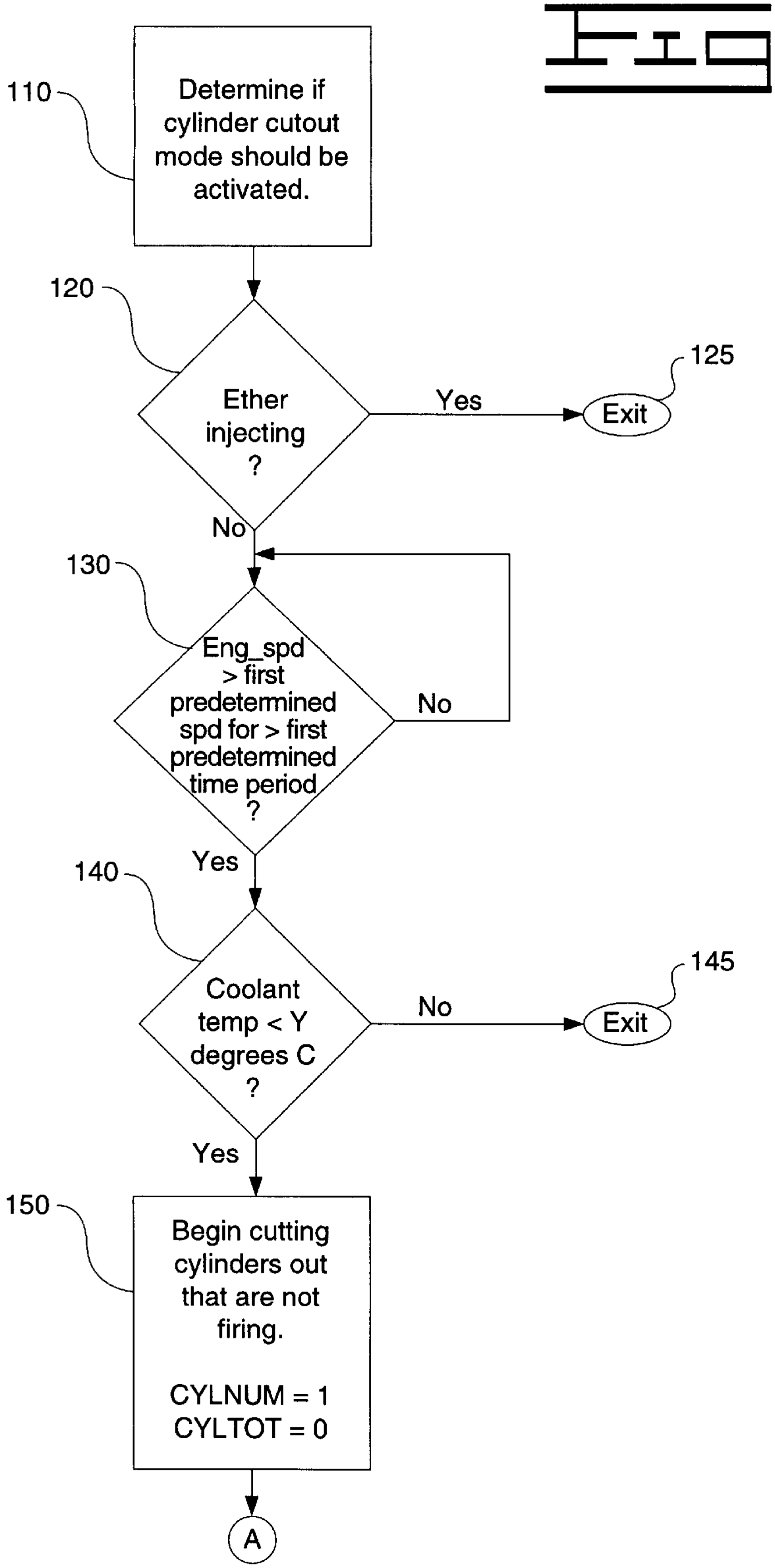
FIG. 2*a*–2*c* illustrates a flowchart of a preferred embodiment of the control implemented by the engine control of FIG. 1.
Figure 2B:
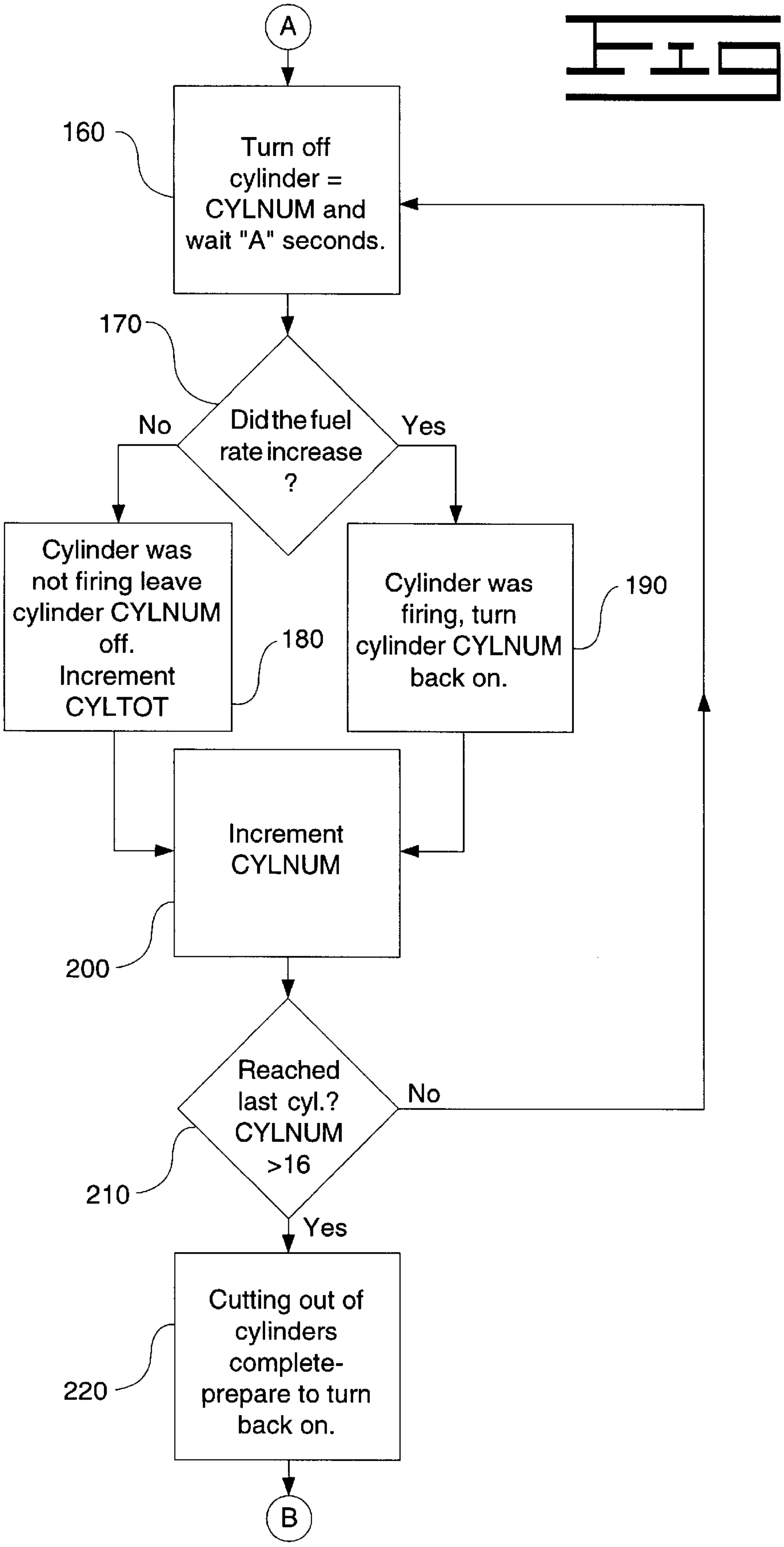

Referring first to FIG. 1, a block diagram of a preferred embodiment of an engine control 10 is shown. The engine control 10 preferably includes a microprocessor 20 connected to a memory device 25. As is known to those skilled in the art, the memory device 25 generally includes both data and software instructions. The data values and software instructions relevant to the present invention will be described in complete detail below, and especially with respect to the flowchart depicted in FIG. 2. In a preferred embodiment, the microprocessor 20 is a Model No. MC68HC11 microprocessor, manufactured by Motorola, Co., headquartered in Schaumberg, Ill. However, it should be readily apparent that other microprocessors could be readily and easily used without deviating from the scope of the present invention as defined by the appended claims.

The microprocessor 20 is also connected to input/output buffer and driver circuitry 30. The input portion of the circuitry 30 is used to buffer the microprocessor 20 from input signals from sensors 40 that may be at higher current and voltage levels than the microprocessor 20 is capable of receiving. The driver portion of such circuitry 30 is used to convert the microprocessor commands into higher current levels used to activate the actuators 50. Such input/output circuitry 30 is well known in the art and therefore is not described further herein.

The actuators 50 in an embodiment of the present invention include fuel injectors that are connected to the engine 35 and associated with specific engine cylinders (not shown). The actuators 50 are responsive to a fuel delivery command signal, generated by the microprocessor 20 and transmitted through the input/output circuitry 30 to deliver a quantity of fuel corresponding to a value of said fuel delivery command signal. Fuel injectors responsive to a fuel delivery command signals are well known in the art. Such fuel injectors will hereafter be included in a general reference to the term actuator 50.

The sensors 40, in an embodiment of the present invention, include an engine speed sensor which generates an engine speed signal indicative of the rotational speed of the engine. Also included is an engine coolant temperature sensor which generates an engine coolant temperature signal. Such speed sensing and coolant sensing devices are well known in the art.

In a preferred embodiment of the present invention, the microprocessor 20 includes an engine speed governor implemented in software Such engine speed governing software routines are well known in the art and typically comprise a form of proportional-integral-derivative ("PID") or proportional-integral ("PI") control. As is known to those skilled in the art, the microprocessor 20 will vary the fuel delivery command signal to the fuel injectors (shown as actuators 50) in response to a difference between a desired engine speed value, an actual engine speed (from an engine speed sensor, here shown as sensors 40), and the specific control objectives of the controller.

In a preferred embodiment, a service tool 60 can be connected through an interface port to a communication bus 55. The service tool is a PC based device that permits an operator or technician to review certain data stored in memory 25 and to affect certain engine performance criteria through programming. For example, a service tool could be used to enable and disable the white smoke reduction feature of the present invention. In a preferred embodiment, the service tool is manufactured by Caterpillar Inc., Peoria, Ill. under the tradenames ECAP or Electronic Technician.

Figure 2C:
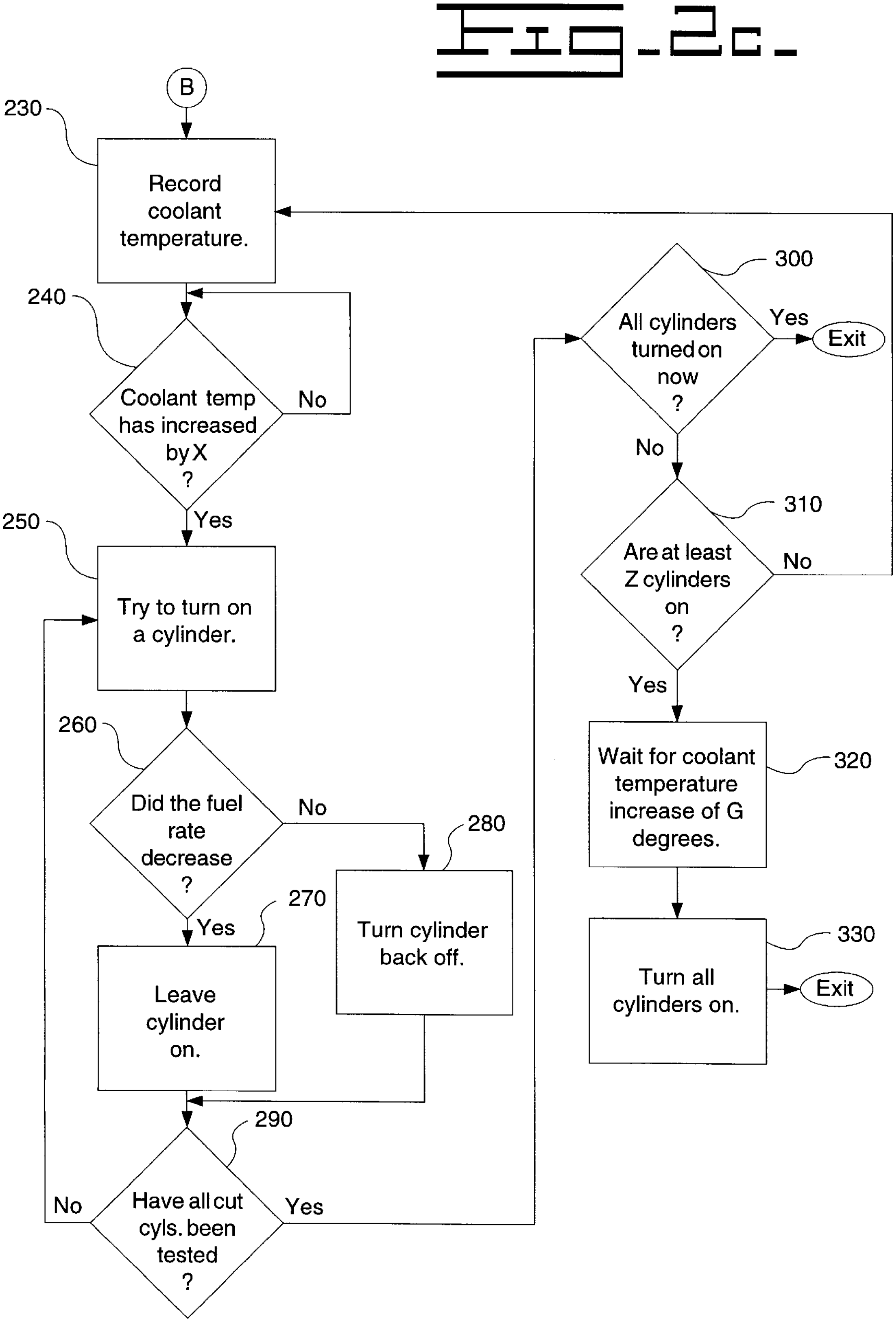

Referring now to FIG. 2, an embodiment of software for programming the microprocessor 20 in accordance with certain aspects of the immediate invention is explained. FIG. 2 is a flowchart illustrating a computer software program for implementing the preferred embodiment of the present invention. The program depicted in this flowchart is particularly well adapted for use with the MC68HC11 microprocessor and associated components described above, although any suitable microprocessor may be utilized in practicing an embodiment of the present invention. These flowcharts constitute a complete and workable design of the preferred software program, and have been reduced to practice on the series MC68HC11 microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

In block 110, the microprocessor verifies the status of the engine operation. Preferably, this includes determining whether:

1) the engine speed has been greater than a speed corresponding to an idle speed for greater that a first predetermined time;
2) the vehicle is in motion;
3) the desired engine speed is below a predetermined threshold;
4) the load on the engine is less than a predetermined load threshold;
5) the vehicle operator has requested greater than a predetermined amount of engine speed through the throttle within a fixed time period.

These conditions typically are involved in determining whether the operator is attempting to use the engine to power the vehicle or accessories or instead is permitting the engine to warm up. Because the problem of white smoke is typically associated with engine warm-up, the method and apparatus of the present invention is typically limited to use in those circumstances. However, even if the engine is otherwise warming up, the operator can override the method and apparatus of the present invention by pressing the throttle or otherwise attempting to apply the engine power to the vehicle load. Although the above five conditions are sensed in a preferred embodiment of the invention, in other embodiments or other applications other conditions could be verified without deviating from the scope of the present invention as defined by the appended claims. Thus, as shown in block 110 of FIG. 2*a*, if the selected desired conditions are satisfied, then program control begins the cylinder cut out strategy exemplified by the flowchart of FIG. 2, and program control passes to block 120.

In a preferred embodiment, ether may be used to assist start-up of the engine. In those applications, program control passes to block 120. In other applications, for example marine applications, ether is not permitted as a starting aid or is otherwise undesirable. In those applications, program control would pass from block 110 straight to 130. These non-ether applications will nevertheless fall within the scope of the present invention as defined by the appended claims.

In block 120, the microprocessor 20 determines whether the system is injecting ether into the engine cylinders to assist in cold starting capabilities. Typically, the microprocessor 20 determines whether ether is being injected by examining a specific flag or register in memory. If ether is being injected, then program control passes to block 125 and the microprocessor 20 exits the cylinder cut out strategy. If, on the other hand, ether is not being injected into the engine cylinders, then program control passes to block 130.

In block 130, the microprocessor determines whether the engine speed signal received from the sensors 40 indicates that the engine speed has exceeded a predetermined low idle speed for greater than a first predetermined time period. If not, program control loops back to block 130 effectively entering a holding loop until the engine speed signal received from the sensors 40 indicates that the engine speed has exceeded a predetermined low idle speed for greater than a first predetermined time period, which in turn indicates that the engine has started and the operator is not still cranking the engine. Then, program control passes to block 140.

In block 140, the microprocessor 20 reads a coolant temperature signal produced by a coolant temperature sensor 40. If the temperature sensor signal indicates that the coolant temperature is not less than a predetermined coolant temperature value then program control passes to block 145 and the microprocessor 20 exits the cylinder cut out strategy. If, on the other hand, the coolant temperature is less that the predetermined coolant temperature value then program control passes to block 150.

In block 150, the microprocessor 20 initializes the variable CYLNUM equal to one/and CYLTOT equal to zero prior to commencing the cut out of specific cylinders. These values are used to keep track of the specific cylinder that is being cut out and to make sure that each cylinder has been cut out. Program control then passes to block 160 on FIG. 2*b*.

In block 160, the microprocessor 20 issues a fuel command corresponding to no fuel to the cylinder number equal to CYLNUM. The microprocessor 20 then waits a predetermined time period (designated A seconds). In a preferred embodiment, the microprocessor 20 waits for 5 seconds. Program control then passes to block 170.

In block 170, the microprocessor 20 determines whether the PID control has increased the fuel level to the remaining cylinders. Whether there is an increase in fueling level or not will determine whether the cylinder that was cut out had been producing power through combustion or whether it was instead producing white smoke. If the cut out cylinder had been firing, then when the fuel to that cylinder is cut out the engine will generate slightly less power (i.e. less by the amount of power that the cut out cylinder had been producing). Because there is less power, the engine speed will begin to drop and the PID engine speed governor will have to increase fuel to the remaining cylinders to make up for the lost power of the cut out cylinder. Thus, if the microprocessor increases the fuel command to the fuel injectors 40 non-cut out cylinders, then the cut out cylinder was firing. On the other hand, if the cut out cylinder is producing white smoke (i.e. not producing power) then cutting fuel to that cylinder will not result in a loss of power. Engine speed will not decrease and the PID controller will not have to increase the fueling level to the remaining cylinders to maintain engine speed. Thus, when the cylinder is producing white smoke, cutting fuel to that cylinder will not result in an increased fuel command to the sensing cylinders.

In block 170, if the fuel rate increases then program control passes to block 190. In block 190, the microprocessor 20 determines that cylinder CYLNUM was firing and resumes fueling of that cylinder. If, in block 170, there was no increase in fueling, then program control will pass to block 180. In block 180, the microprocessor determines that the cylinder was not firing and does not resume fueling of the cylinder CYLNUM. The microprocessor 20 also increments a variable CYLTOT which represents the total number of cutout cylinders whose fueling was not resumed after the cutout test. From either block 180 or block 190, program control passes to block 200.

In block 200, the microprocessor increments the variable CYLNUM and program control passes to block 210.

In block 210, the microprocessor 20 determines whether the variable CYLNUM is greater that the number of cylinders for the given engine. In a preferred embodiment, as shown in the flowchart, the invention is used in connection with an engine having sixteen cylinders. However, the present invention is not limited to an engine having sixteen cylinders. To the contrary, an engine having greater or fewer than sixteen cylinders and using the cut out method and apparatus is within the scope of the present invention as defined by the appended claims. If the variable CYLNUM is less than sixteen, then the microprocessor 20 has not performed a cut out on every cylinder and program control loops back to block 160. Program control will continue to loop through blocks 160, 170, 180 or 190, 200, and 210 until CYLNUM exceeds sixteen, indicating that the microprocessor has performed a cut out on each engine cylinder. Then, program control passes to block 220.

In the blocks 220 and following, the microprocessor 20 keeps those cylinders that were cut out from receiving fuel until a sensed engine parameter indicates that the engine has warmed up and thus, the cut out cylinders will begin firing if fuel is again injected into the cylinder. Thus, block 220 indicates that the microprocessor 20 has completed the portion of the procedure where the cylinders for cut out have been identified and tested, and prepares to begin re-fueling those cylinders, when appropriate. Program control passes to block 230.

In block 230, the microprocessor 20 reads a coolant temperature signal produced by a coolant temperature sensor (shown generally in FIG. 1 as sensors 40). The microprocessor 20 stores a value representing the engine coolant temperature in memory 25. Program control then passes to block 240.

In block 240, the microprocessor 20 causes the program control to enter a loop until the coolant temperature increases by a predetermined temperature X. In a preferred embodiment, the predetermined temperature increase is about 6 deg.F. However, other temperature increases could be readily and easily used without deviating from the scope of the present invention as defined by the appended claims. Block 240 checks to determine whether the engine has sufficiently warmed up for the cut out cylinders to begin firing. Program control then passes to block 250.

In block 250, the microprocessor 20 begins fueling one of the cutout cylinders. Program control then passes to block 260 where the microprocessor determines whether the fueling rate decreases as a result of fueling the cut out cylinder. Whether there is a decrease in fueling level or not will determine whether the cut out cylinder now being fueled is firing and adding power to the engine or is still producing white smoke. If the cut out cylinder is now firing, then it will generate power when it is fueled, which will tend to cause the engine speed to increase. The PID engine speed governor will control to the constant desired speed, and therefore will decrease the fuel rate to maintain a constant speed. Thus, if the cylinder is firing the fueling rate will decrease when it is once again fueled. In that case program control passes to block 270, where the microprocessor leaves the cylinder on. If the fuel rate did not decrease, however, then the cut out cylinder still is not firing and program control passes to block 280 where the microprocessor discontinues fueling the cylinder and leaves it in a cut out state. Program control then passes to block 290.

In block 290, the microprocessor 20 determines whether all the cylinders that were cut out have been tested in blocks 250, 260 and 270 or 280 to determine whether they should be turned on. If not, then program control continues to loop back to block 250 until all cut out cylinders have been tested. Program control then passes to block 300.

In block 300, the microprocessor 20 checks to see whether all cylinders are now on. If so, then program control exits the cut out routine. Otherwise, program control passes to block 310.

In block 310, the microprocessor 20 checks to see whether at least Z cylinders are on. In a preferred embodiment, Z is 14 cylinders for a typical sixteen cylinder engine application. However, a greater or fewer number could be used without deviating from the scope of the present invention as defined by the appended claims. If Z cylinders have not been turned on then program control loops back through blocks 230 and 240 (where the microprocessor waits for a coolant temperature increase), blocks 250 through 290 (where the microprocessor checks to see whether the remaining cylinders that were cut out are now firing), and blocks 300 and 310 (to see whether a minimum number of cylinders are firing). Once all, or the minimum number Z, cylinders are firing, then program control passes to block 320.

In block 320, the microprocessor 20 waits for a temperature increase of the coolant temperature of G degrees F. In a preferred embodiment, G is 160 deg.F. However, other values can be readily and easily used without deviating from the scope of the present invention as defined by the appended claims. Program control then passes to block 330.

In block 330, the microprocessor 20 begins fueling all of the remaining cut out cylinders. Thus, at this point all of the cylinders are being fueled. Program control then exits the cut out strategy.

The apparatus and method of the present invention is particularly useful in equipment or vehicles powered by diesel engines. Such engines are susceptible to producing white smoke when starting in cold weather. The apparatus and method are implemented automatically when the operator starts the engine. If a particular engine cylinder is producing white smoke then it is no longer fueled until it begins firing. If the operator begins to apply the engine power to a load, for example by attempting to drive the equipment or vehicle prior to the end of the cut out procedure, then the system exits the cut out strategy and all cylinders are fueled. By following the strategy of the present invention, white smoke is significantly reduced during engine warmup.

We claim:

1. An apparatus for reducing the white smoke output of a compression ignition engine, said apparatus including:

an electronic controller;

a memory device connected to said electronic controller;

an engine speed sensor producing an engine speed signal, said engine speed sensor being connected to said electronic controller;

a fuel injector electronically connected to said electronic controller, wherein the fuel injector delivers a quantity of fuel corresponding to a fuel delivery signal produced by said electronic controller;

wherein said electronic controller produces the fuel delivery signal as a function of a difference between said desired engine speed value and said engine speed signal;

wherein said electronic controller stores a first fueling rate in memory, cuts fuel to an engine cylinder and subsequently determines a second fueling rate; and wherein said electronic controller compares said first fueling rate to said second fueling rate and responsively determines whether said cylinder is firing.

2. The apparatus according to claim 1, wherein said electronic controller cuts fuel delivery to the engine cylinder when said second fueling rate exceeds said first fueling rate.

3. The apparatus according to claim 1, wherein said electronic controller re-initiates fuel delivery to the engine cylinder when said second fueling rate is the same or less than said first fueling rate.

4. The apparatus according to claim 1, including an engine coolant temperature sensor, said sensor producing a coolant temperature signal and said electronic controller receiving said coolant temperature signal.

5. A method for determining whether an engine cylinder, in an engine having a plurality of engine cylinders, is producing white smoke, said engine including an electronic controller performing engine speed governing, an engine speed sensor, and electronically controlled fuel injectors responsive to a fuel injection signal, said method including:

determining when a first set of engine operating conditions are satisfied;

measuring a first fuel rate in response to said step of determining;

cutting fuel flow to a selected engine cylinder;

measuring a second fuel flow rate; and determining whether said selected engine cylinder is firing in response to a comparison between said first and second fuel flow rates.

* * * * *